US012068524B2

(12) United States Patent
Guth et al.

(10) Patent No.: US 12,068,524 B2
(45) Date of Patent: Aug. 20, 2024

(54) VEHICLE PANE

(71) Applicant: SAINT-GOBAIN GLASS FRANCE, Courbevoie (FR)

(72) Inventors: Adrien Guth, Aachen (DE); Guillaume Francois, Aachen (DE); Guillaume Petitdidier, Boulogne-Billancourt (FR); Varun Ramesh Kumar, Aachen (DE)

(73) Assignee: SAINT-GOBAIN GLASS FRANCE, Courbevoie (FR)

( * ) Notice: Subject to any disclaimer, the term of this patent is extended or adjusted under 35 U.S.C. 154(b) by 201 days.

(21) Appl. No.: 17/782,498

(22) PCT Filed: Dec. 2, 2020

(86) PCT No.: PCT/EP2020/084200
§ 371 (c)(1),
(2) Date: Jun. 3, 2022

(87) PCT Pub. No.: WO2021/110713
PCT Pub. Date: Jun. 10, 2021

(65) Prior Publication Data
US 2022/0416399 A1    Dec. 29, 2022

(30) Foreign Application Priority Data
Dec. 5, 2019  (EP) .................................. 19213751

(51) Int. Cl.
*H01Q 1/12*  (2006.01)
*B60J 1/00*  (2006.01)
(Continued)

(52) U.S. Cl.
CPC ............ *H01Q 1/1271* (2013.01); *B60J 1/001* (2013.01); *B60J 1/02* (2013.01)

(58) Field of Classification Search
CPC .... B60J 1/001; B60J 1/02; H01Q 1/12; H01Q 1/1271; H01Q 1/28; H01Q 1/32; H01Q 1/325; H01Q 13/08; H01Q 13/085
See application file for complete search history.

(56) References Cited

U.S. PATENT DOCUMENTS 5,872,542 A      2/1999  Simons et al.
6,518,931 B1 *   2/2003  Sievenpiper ......... H01Q 15/008
                                                        343/770

(Continued)

FOREIGN PATENT DOCUMENTS

DE    10 2011 004316 A1    8/2012

OTHER PUBLICATIONS

HR International Search Report as issued in International Patent Application No. PCT/EP2020/084200, dated Feb. 2, 2021.

*Primary Examiner* — Tho G Phan
(74) *Attorney, Agent, or Firm* — Pillsbury Winthrop Shaw Pittman LLP

(57) ABSTRACT

A vehicle pane has a first substrate and at least one first electrically conducting layer, wherein an antenna structure is formed in the electrically conducting layer, wherein the antenna structure provides a Vivaldi-antenna-like structure, wherein the antenna structure has two substantially identical antenna elements, wherein the two antenna elements are arranged at an angle relative to one another, wherein the angle is greater than 0° and less than 180° such that the antenna elements appear substantially as mirror images at the angle bisector.

16 Claims, 3 Drawing Sheets

(51) Int. Cl.
     *B60J 1/02*     (2006.01)
     *H01Q 1/32*    (2006.01)

(56) References Cited

U.S. PATENT DOCUMENTS

| | | |
|---|---|---|
| 10,665,919 B2 * | 5/2020 | Droste .............. B32B 17/10293 |
| 11,509,036 B2 * | 11/2022 | Furlan .................. H01Q 1/3233 |
| 11,774,579 B1 * | 10/2023 | Wang .................... G01S 13/865 |
| | | 324/329 |
| 2008/0129619 A1 | 6/2008 | Lee et al. |
| 2014/0176374 A1 | 6/2014 | Lo |
| 2019/0165447 A1 | 5/2019 | Furlan |
| 2022/0371410 A1 * | 11/2022 | Schürgers ........... B32B 17/1077 |

\* cited by examiner

VEHICLE PANE

CROSS-REFERENCE TO RELATED APPLICATIONS

This application is the U.S. National Stage of PCT/EP2020/084200, filed Dec. 2, 2020, which in turn claims priority to European patent application number 19213751.1 filed Dec. 5, 2019. The content of these applications are incorporated herein by reference in their entireties.

FIELD

The present disclosure relates to a vehicle pane that comprises an antenna.

BACKGROUND

Vehicles are increasingly being equipped with electrical components. In addition to the conventional radio equipment, an increasing number of devices that can receive or even transmit high-frequency signals are found in a vehicle.

Mentioned here by way of example is the reception of signals of a communication system.

Communication systems can be, for example, short-range radio systems for car-to-car or car-to-infrastructure or also mobile phone communication systems, e.g., 2G, 3G, 4G, or 5G mobile communication systems.

Since vehicles often have relatively large metal surfaces, high-frequency signals are shielded by these, making reception (and transmission—if provided) more difficult.

Although appropriate antennas can be attached on the outside of the vehicle, such additional devices pose a problem in several respects.

Exemplary assemblies are known from the publication US 20140176374 A1.

For one thing, such devices require penetrations that are susceptible to corrosion. For another, such devices often interfere with the visual impression. However, such devices often also provide a source of noise as well as increased wind resistance. In addition, such antennas are also a target of vandalism.

For example, "shark fin" type antennas are provided on roofs. In this case, for example, the vehicle roof acts as a reflector or grounding surface. As a rule, so-called "patch antennas" are used for this. These typically have a rectangular or square shape with a roughly identical ground layer arranged below the patch antenna as an antenna counterweight.

Based on this, a trend developed in the past to provide antennas at other locations.

For example, antennas can be arranged within the vehicle interior, for example, under the dashboard or under the windshield.

In this case, it is difficult to find a suitable position with a good view of the antenna to the transmitters and, at the same time, to avoid EMC problems caused by electrical devices in the dashboard and by the vehicle engine. Furthermore, the mechanical integration places high demands on tightness (e.g., against moisture) and reliability of cable runs.

On the other hand, there is the need to interfere as little as possible with the field of vision through a pane. Consequently, sensors are arranged, for example, at the edge of the pane, preferably in the region of a black imprint.

A Vivaldi antenna is known from patent application US 2019/0 165447 A1. The Vivaldi antennas disclosed there are optimized for reception of signals of a global navigation satellite system. Despite being broadband, the antennas are inadequate for multiband reception. In addition, the antennas presented there require a relatively large space, greatly limiting their placement.

A surface-mountable antenna for receiving polarized signals is known from patent application US 2008/129619 A1. However, the antenna disclosed there requires a large surface area and, due to the necessary height required for the various electrical layers, is unsuitable for integration into a pane.

DE 10 2011 004316 A1 discloses a multiband antenna comprising a first planar subantenna on a carrier, which has a comb structure in some sections. The first subantenna has an aperture in the carrier, with a second subantenna formed within the first subantenna such that its directivity points in the direction of the aperture axis and is suitable for communication in a second frequency band.

U.S. Pat. No. 5,872,542 A discloses a patch antenna comprising a ground layer, a feed layer, an antenna layer, and a transparent substrate. The antenna is suitable for transmitting transmit and receiving high-frequency signal.

However, in the region of the black imprint of the pane, only a few locations are suitable for mounting such an antenna.

In particular, provision at the central upper edge of the windshield is difficult because other sensors, such as rain sensors, are often installed there such that no space is available there for further elements.

Provision in the region of the dashboard is disadvantageous because visibility of one or more transmitters is not always sufficient, particularly since other auto body parts, such as the vehicle roof, severely restrict the solid angle range that can be received from the point of view of an antenna placed there.

Furthermore, electrically conductive layers, such as infrared reflective layers or low-E layers can prevent the transmission of electromagnetic radiation through the pane and adversely affect the reception of desired signals. Such panes are found, for example, in vehicle construction.

SUMMARY

Based on this, an object of the invention is to provide a vehicle pane in which an antenna can be integrated safely, reliably, and economically at other locations.

The object is accomplished by a vehicle pane comprising a first substrate and at least one first electrically conducting layer, wherein an antenna structure is formed in the electrically conducting layer, wherein the antenna structure provides a Vivaldi-antenna-like structure, wherein the antenna structure has two substantially identical antenna elements, wherein the two antenna elements are arranged at an angle relative to one another, wherein the angle is greater than 0° and less than 180° such that the antenna elements substantially appear as mirror images at the angle bisector.

With the assembly presented, it is now possible not only to open up additional locations for placement without violating the boundary conditions for visibility, but it is also made possible to provide good reception performance over wide frequency ranges.

In one embodiment of the invention, the antenna structure is set up to receive signals of a mobile radio network.

Mobile radio networks are of particular significance due to the ever-increasing networking of vehicles and requirements of legal regulations, such as eCall. A large number of different frequency bands are used in mobile communication networks. With the vehicle pane claimed, it is now possible to provide improved reception/transmission conditions for a number of frequency bands.

According to another embodiment of the invention, the first electrically conducting layer is arranged on a film that is connected to the vehicle pane.

Prefabrication on a film allows particularly economical production.

According to another embodiment of the invention, the angle is selected from an angle range of 120° to 60°.

In other words, through the selection of the angle, both the reception characteristics relative to the frequency ranges received and the shape can be adapted to the conditions of the vehicle pane.

In one embodiment of the invention, the first electrically conducting layer is applied to a dielectric film.

The application on a dielectric film also makes it possible to integrate further components.

In one embodiment of the invention, the film has a second electrically conducting layer, arranged on the opposite side of the first electrically conducting layer. As a result, two components can be integrated on the film, with measurements having shown that the vehicle pane thus has very good antenna properties. This result was unexpected and surprising for the person skilled in the art.

This allows, for example, strip conductors/waveguide structures to be provided in a wide variety of designs, e.g., as a grounded co-planar waveguide.

In yet another embodiment of the invention, the electrically conducting layer has a height of 10 μm-75 μm auf.

This enables a thin assembly that can also be integrated into a laminated pane or that can also be adapted to a curved surface.

In another embodiment of the invention, the vehicle pane is a laminated pane, wherein the vehicle pane further has a second substrate, wherein the film is introduced between the first substrate and the second substrate.

In other words, the film can be introduced both on an outer face of the pane and between substrates of a laminated pane.

According to yet another embodiment of the invention, the vehicle pane has, on at least one section at the edge of the vehicle pane, a black imprint (also referred to as a masking print) extending over a corner of the vehicle pane, wherein the first electrically conducting layer is arranged behind the black imprint, at least in some sections.

Thus, the antenna assembly can be placed below the black imprint such that the antenna structure remains optically invisible and thus does not interfere with the aesthetic impression, but, on the other hand, also remains electrically effective.

According to yet another embodiment of the invention, the antenna structure has, at least in a first frequency band below 1 GHZ and at least in a second frequency band above 1 GHZ, a reflection coefficient S11 of −6 dB or better, e.g., −15 dB.

Thus, excellent reception performance can be provided simultaneously in multiple frequency bands.

According to yet another embodiment of the invention, the antenna structure is set up to receive signals of a wireless short-range communication network.

In other words, the invention can, for example, also be used for both car-to-car and car-to-infrastructure communication.

According to another embodiment of the invention, a vehicle having a glass pane according to the invention is provided, in particular a land, water, air, or space vehicle.

According to another embodiment of the invention, the vehicle pane is used to receive signals of a mobile communication network of the first generation and/or 2G and/or 3G and/or 4G and/or 5G.

According to another embodiment of the invention, the vehicle pane is used to receive signals of a WLAN network and/or signals of a car-to-car network and/or signals of a car-to-infrastructure network and/or Bluetooth (also Bluetooth Low Energy).

BRIEF DESCRIPTION OF THE DRAWINGS

In the following, the invention is explained in detail with reference to drawings and exemplary embodiments. The figures are schematic representations and are not to scale. The figures in no way restrict the invention.

They depict.

DETAILED DESCRIPTION

In the following, the invention is presented in greater detail with reference to the figures. It should be noted that different aspects are described, each of which can be used individually or in combination. In other words, any aspect can be used with different embodiments of the invention, unless explicitly presented as a pure alternative.

Insofar as methods are described in the following, the individual steps of a method can be arranged in any order and/or combined, provided the context does not explicitly indicate otherwise. Furthermore, the methods can be combined with each other—unless expressly indicated otherwise.

Statements with numerical values are generally to be understood not as exact values, but also include a tolerance of +/−1% up to +/−10%.

Insofar as standards, specifications, or the like are mentioned in this application, at least the standards, specifications, or the like applicable on the filing date are always referred to. In other words, if a standard/specification, etc. is updated or replaced by a successor, the invention is also applicable thereto.

Various embodiments are depicted in the figures.

Figure 1:
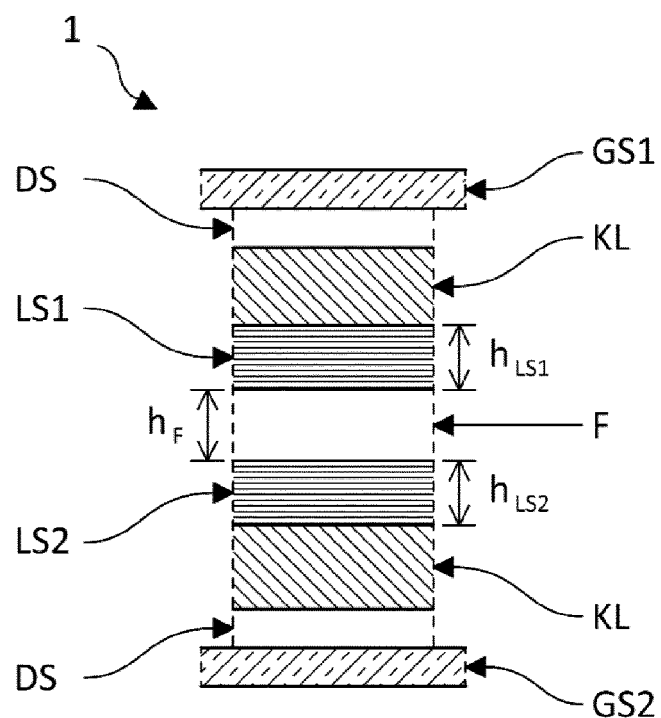
FIG. 1 a schematic overview relative to the arrangement of films, substrate(s), to clarify aspects according to prior art and the invention, FIG. 2 a schematic overview of possible mounting locations of antenna structures according to embodiments of the invention, FIG. 3 a schematic plan view of antenna structures in embodiments of the invention, FIG. 4 a schematic plan view of a virtual sub-element of an antenna structure in embodiments of the invention, and FIG. 5 an S11 diagram relative to an exemplary antenna structure in embodiments of the invention.

A vehicle pane 1 according to the invention is shown with a plurality of layers in section in FIG. 1. Not all the layers shown are necessary in the following.

A vehicle pane 1 according to the invention has a first substrate GS1 and at least one first electrically conducting layer LS1.

The first substrate GS1 can be, for example, a glass substrate or a plastic substrate. In principle, all electrically insulating substrates that are thermally and chemically stable under the conditions of production and use of the vehicle pane according to the invention are suitable as a substrate.

A first substrate GS1 preferably contains flat glass, float glass, quartz glass, borosilicate glass, soda lime glass, or clear plastics, preferably rigid clear plastics, in particular polyethylene, polypropylene, polycarbonate, polymethyl methacrylate, polystyrene, polyamide, polyester, polyvinyl chloride, and/or mixtures thereof.

The electrically conducting layer LS1 has, for example, copper, silver, gold, or alloys with at least one of the aforementioned materials.

An antenna structure ANT1 is formed in the electrically conducting layer LS1. This can, for example, be accomplished by printing or ablative mechanical and/or chemical methods and is irrelevant in the following for the detailed understanding of the invention.

The antenna structure ANT1 provides a Vivaldi-antenna-like structure.

Vivaldi-antenna-like structures generally have a funnel-shaped radiation area, an impedance matching area (often a circular opening at the end of the funnel). Typically, a type of bottleneck is also provided between the impedance matching area and the funnel, where the feed point of the antenna is often arranged.

This antenna structure will now be explained in more detail, with the feeding of the antenna, i.e., the connection to an antenna line not being further explained in the following. Exemplary antenna lines can, for example, be a co-planar waveguide, in particular, a grounded co-planar waveguide.

The structure of the antenna ANT1 is further explained below in connection with FIGS. 3 and 4.

Figure 4:
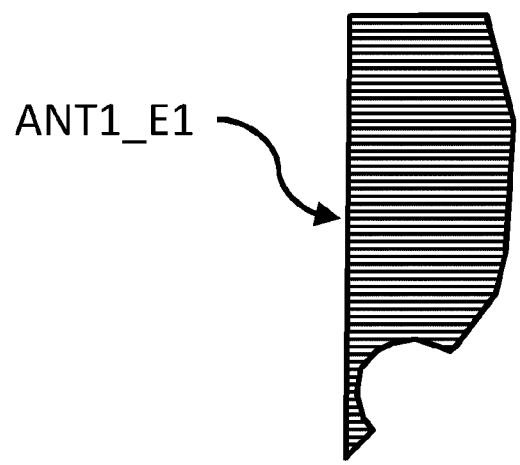

The antenna structure can be "virtually" divided into two halves, antenna elements ANT1_E1 and ANT1_E2,—as depicted in FIG. 4—with the antenna elements ANT1_E1 and ANT1_E2 being substantially identical.

Figure 3:
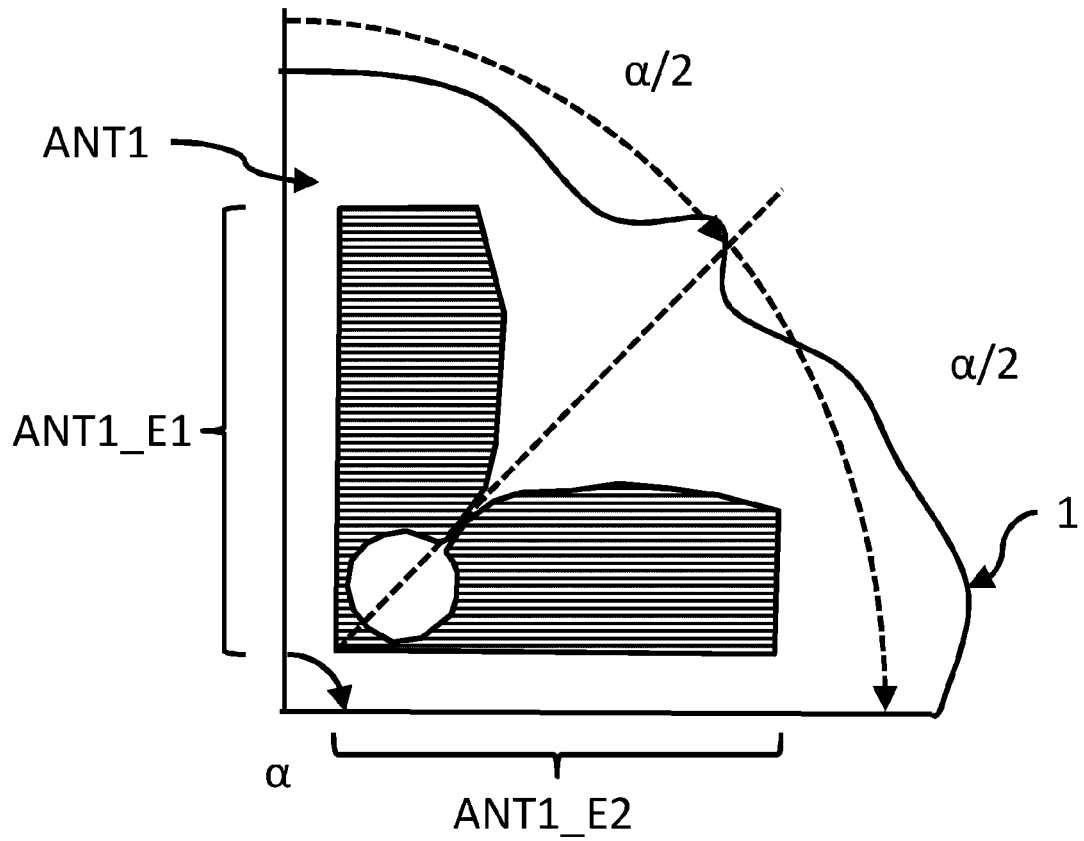

In other words, the antenna elements ANT1_E1, ANT1_E2 can be viewed as being arranged at an angle relative to one another such that the antenna elements ANT1_E1, ANT1_E2 appear substantially as mirror images at the angle bisector (shown as a dashed line in FIG. 3).

The substantially identical design refers to the fact that complete congruence does not have to be achieved. Thus, for example, degrees of freedom still remain to provide adaptations to the environment of the vehicle pane, e.g., electrically conducting vehicle parts. As a general rule, it can be assumed that at least 75% of the area, in particular 90% of the area, can be "virtually" superimposed congruently.

The congruence described above can be achieved by "virtual" mirroring on an angle bisector a. In FIG. 3, this angle a, enclosed by the antenna elements ANT1_E1 and ANT1_E2, is approx. 90°.

Most generally speaking, the angle a is greater than 0° and less than 180°. In a preferred embodiment, the angle is selected from an angle range of 120° to 60° and particularly preferably from an angle range of 105° to 75°.

With the arrangement presented, which is characterized in particular by the angular arrangement, it is now possible not only to open up further locations on a vehicle pane for placement without violating the boundary conditions for visibility, but it is also made possible to provide good reception performance over wide frequency ranges. In other words, the selection of the angle makes it possible to adapt both the reception characteristics relative to the frequency ranges received and the shape relative to the conditions of the vehicle pane.

According to one embodiment of the invention, the antenna structure ANT1 is set up to receive signals of a mobile radio network.

Mobile radio networks are of particular significance due to the ever-increasing networking of vehicles and the requirements of legal regulations, such as eCall. In particular, a large number of different frequency bands are used in mobile communications networks. With the vehicle pane claimed, it is now possible to provide improved reception/transmission conditions for a number of frequency bands.

In another embodiment, the first electrically conducting layer LS1 is arranged on a film F, which is connected to the vehicle pane.

In particular, the film F can comprise at least one material selected from the group comprising polyimide, polyurethane, polymethylene metacrylic acid, polycarbonate, polyethylene terephthalate, polyvinyl butyral, FR6, acrylonitrile-butadiene-styrene copolymer, polyethylene, polypropylene, polyvinyl chloride, polystyrene, polybutylene terephthalate, polyamide.

Without loss of generality, still more layers can be provided—as indicated in FIG. 1.

An adhesion-promoting layer KL can optionally be applied to the first electrically conducting layer LS1 and/or, if present, to a second electrically conducting layer LS2. This adhesion-promoting layer KL can, for example, have a height of approx. 15 µm in each case. The adhesion-promoting layer KL can comprise at least one material selected from the group comprising polyimide, polyurethane, polymethylene metacrylic acid, polycarbonate, polyethylene terephthalate, polyvinyl butyral, FR6, the acrylonitrile-butadiene-styrene copolymer, polyethylene, polypropylene, polyvinyl chloride, polystyrene, polybutylene terephthalate, polyamide.

The cover layer DS can, for example, be a black imprint such that parts of the antenna structure ANT1 can be provided in a concealed manner without adversely affecting the visual impression in the rest of the vehicle pane 1. The cover layer DS can be arranged between a substrate GS1, GS2, preferably the second substrate GS2, and an electrically conducting layer LS1, LS2, preferably the second electrically conducting layer LS2. On the other hand, the cover layer DS can also comprise polyimide. For example, the cover layer DS can have a height of (in each case) approx. 25 µm. If, for example, a film is prefabricated with conductor layers, the conductor layers LS1, LS2 can be protected against damage during transport or fabrication or installation or environmental influences.

This enables a thin assembly that can also be integrated into a laminated pane or can also be adapted to a curved surface.

In another embodiment of the invention, the first electrically conducting layer LS1 is applied on a dielectric film F.

The application on a dielectric film also makes it possible to integrate further components.

In one embodiment of the invention, the film F has a second electrically conducting layer LS2, arranged on the opposite side of the first electrically conducting layer LS1.

The electrically conducting layer LS2 has, for example, copper, silver, gold, or alloys with at least one of the aforementioned materials.

This allows, for example, strip conductors/waveguide structures to be provided in a wide variety of designs, e.g., as a grounded co-planar waveguide.

In yet another embodiment of the invention, the first electrically conducting layer LS1 and/or, if present, a second electrically conducting layer LS2 has a height $h_{LS1}$, $h_{LS2}$ of 10 µm-75 µm.

This enables a thin assembly that can also be integrated into a laminated pane or that can also be adapted to a curved surface.

In another embodiment of the invention, the vehicle pane is a laminated pane, wherein the vehicle pane further has a second substrate GS2, wherein the film F is introduced between the first substrate GS1 and the second substrate GS2.

The second substrate GS2 can be, for example, a glass substrate or a plastic substrate. In principle, all electrically insulating substrates that are thermally and chemically stable under the conditions of production and use of the vehicle pane according to the invention are suitable as a substrate.

A second substrate GS2 preferably contains flat glass, float glass, quartz glass, borosilicate glass, soda lime glass, or clear plastics, preferably rigid clear plastics, in particular polyethylene, polypropylene, polycarbonate, polymethyl methacrylate, polystyrene, polyamide, polyester, polyvinyl chloride, and/or mixtures thereof.

In other words, the film can be introduced both on an outer face of the pane and between substrates of a laminated pane.

Figure 2:
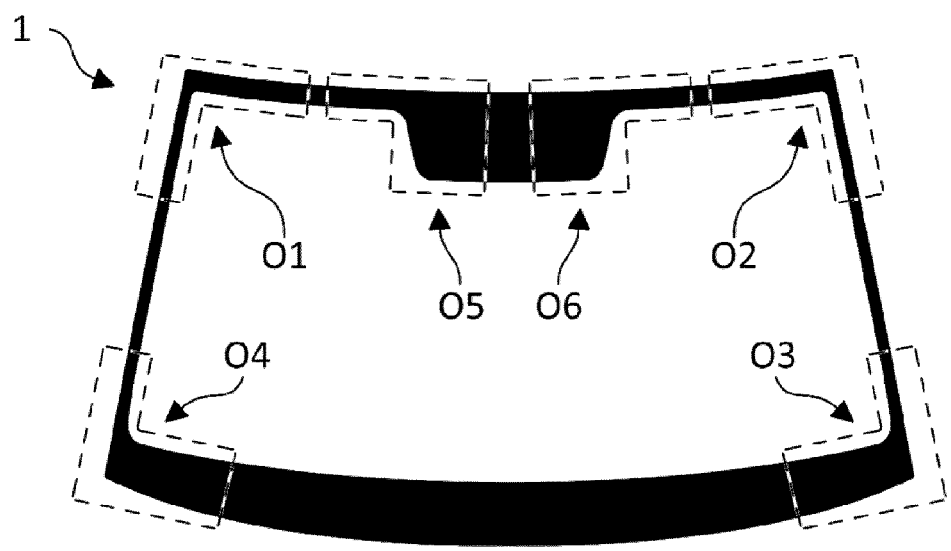

According to yet another embodiment of the invention, depicted by way of example in FIG. 2, the vehicle pane has, on at least one section at the edge of the vehicle pane, a black imprint extending over a corner of the vehicle pane, wherein the first electrically conducting layer LS1 is arranged behind the black imprint, at least in some sections.

For example, the predefined antenna structure can be placed at the locations O1, O2, O3, O4, O5, or O6, with the locations being selected by way of example and not constituting an exhaustive list. In other words, as a result of the angular design, the antenna structure ANT1 can be placed in particular at corners (in particular in corners of a black imprint). In this way, the antenna assembly can be placed below the black imprint such that the antenna assembly remains optically invisible and thus does not interfere with the aesthetic impression, but, on the other hand, also remains electrically effective.

Without loss of generality, multiple such antenna structures ANT1 can be arranged at different locations O1 to O6 in a vehicle pane 1. In this case, it is also possible to combine them by suitable circuits such that, for example, circularly polarized signals can also be received.

Figure 5:
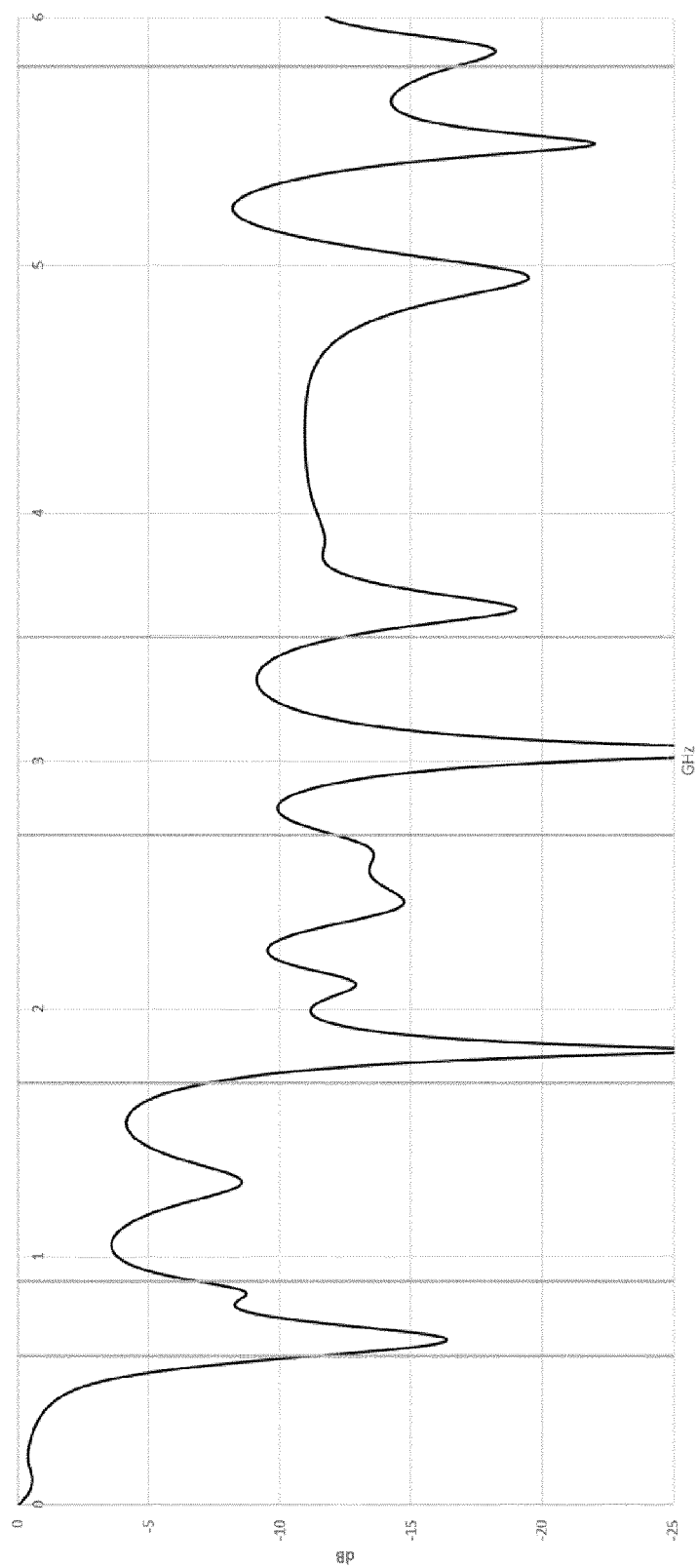

According to yet another embodiment of the invention, the antenna structure ANT1 has, at least in a first frequency band below 1 GHz and at least in a second frequency band above 1 GHZ, a reflection coefficient S11 of −6 dB or better, e.g., −15 dB or better. Reference is made, by way of example, to FIG. 5. It should be noted that the invention could be set, of course, alternatively or additionally, by matching to other frequency bands, e.g., a second frequency band below 2 GHZ and a third frequency band above 2 GHZ, for a reflection coefficient S11 of −6 dB or better, e.g., −15 dB or better.

Exemplary frequency bands are the previous UMTS band at 900 MHz or 1800 MHZ; the 700 MHZ, 800 MHZ, 1500 MHZ, and 2600 MHZ and 3.5 GHZ and 3.7 GHZ LTE bands as well as future structure 26 GHz and 60 GHZ LTE bands.

In one embodiment of the invention, the antenna structure ANT1 is set up to receive signals of a wireless short-range communication network.

Exemplary frequency bands are the 2.4 GHZ/5 GHZ and 60 GHZ WLAN bands. In other words, the invention can also be used, for example, for car-to-car as well as car-to-infrastructure communication, for which frequencies in the 5.9 GHz range are currently favored.

According to another embodiment of the invention, a vehicle having a glass pane according to the invention is provided, in particular a land, water, air, or space vehicle.

According to another embodiment of the invention, the vehicle pane is used to receive signals of a mobile communication network of the first generation and/or 2G and/or 3G and/or 4G and/or 5G.

According to another embodiment of the invention, the vehicle pane is used to receive signals of a WLAN network and/or Bluetooth (also Bluetooth Low Energy) and/or signals of a car-to-car network and/or signals of a car-to-infrastructure network.

LIST OF REFERENCE CHARACTERS 1 vehicle pane
GS1 substrate
GS2 substrate
F film
LS1 electrically conducting layer
LS2 electrically conducting layer
ANT1 antenna structure
ANT1_E1 antenna element
ANT1_E2 antenna element
$H_{LS1}$ height
hi_s2 height
DS (electrically insulating) cover layer
adhesion-promoting layer KL
O1 . . . O6 mounting locations

The invention claimed is:

1. A vehicle pane comprising a first substrate and at least one first electrically conducting layer,
wherein an antenna structure is formed in the first electrically conducting layer,
wherein the antenna structure provides a Vivaldi-antenna structure,
wherein the antenna structure has two substantially identical antenna elements,
wherein the two antenna elements are arranged at an angle relative to one another to form together an angular antenna structure having a corner, and
wherein the angle is greater than 0° and less than 180° such that the two antenna elements appear substantially as mirror images at the angle bisector.

2. The vehicle pane according to claim 1, wherein the antenna structure is set up to receive signals of a mobile radio network.

3. The vehicle pane according to claim 1, wherein the first electrically conducting layer is arranged on a film that is connected to the vehicle pane.

4. The vehicle pane according to claim 3, wherein the vehicle pane is a laminated pane, wherein the vehicle pane further has a second substrate, wherein the film is introduced between the first substrate and the second substrate.

5. The vehicle pane according to claim 1, wherein the angle is selected from an angle range of 120° to 60°.

6. The vehicle pane according to claim 1, wherein the first electrically conducting layer is applied on a dielectric film.

7. The vehicle pane according to claim 6, wherein the film has a second electrically conducting layer arranged on the opposite side of the first electrically conducting layer.

8. The vehicle pane according to claim 1, wherein the first electrically conducting layer has a height of 10 μm-75 μm.

9. The vehicle pane according to claim 1, comprising a black imprint on at least one section at an edge of the vehicle pane, which imprint extends over a corner of the vehicle pane, wherein the first electrically conducting layer is arranged behind the black imprint, at least in some sections.

10. The vehicle pane according to claim 1, wherein the antenna structure has, at least in a first frequency band below 1 GHz and at least in a second frequency band above 1 GHz, a reflection coefficient S11 of −6 dB or better.

11. The vehicle pane according to claim 1, wherein the antenna structure is set up to receive signals of a wireless short-range communication network.

12. A vehicle with a vehicle pane according to claim 1.

13. A method comprising receiving signals of a mobile communication network of the first generation, and/or 2G and/or 3G and/or 4G and/or 5G with a vehicle pane according to claim 1.

14. A method comprising receiving signals of a WLAN network and/or signals of a car-to-car network and/or signals of a car-to-infrastructure network with a vehicle pane according to claim 1.

15. The vehicle pane according to claim 1, wherein at least part of each of the two substantially identical antenna elements define the corner of the angular antenna structure.

16. The vehicle pane according to claim 1, wherein each of the two substantially identical antenna elements extend from the corner of the angular antenna structure.

* * * * *